United States Patent [19]

Bradford

[11] Patent Number: 4,602,680

[45] Date of Patent: Jul. 29, 1986

[54] METHOD AND APPARATUS FOR REMOVING MOISTURE FROM COMPRESSED AIR

[76] Inventor: William D. Bradford, Rte. 8, Box 72-3, Gonzales, La. 70737

[21] Appl. No.: 758,764

[22] Filed: Jul. 25, 1985

[51] Int. Cl.$^4$ ............................................... F23B 1/06
[52] U.S. Cl. ................................ 165/111; 165/104.19; 417/243
[58] Field of Search ................... 165/111, 110, 104.19; 417/243; 62/93

[56] References Cited

U.S. PATENT DOCUMENTS

| | | | |
|---|---|---|---|
| 1,435,135 | 11/1922 | Clapp | 417/243 |
| 1,582,028 | 4/1926 | Dunn | 417/243 |
| 1,805,101 | 5/1931 | Modine | 417/243 |
| 1,840,265 | 1/1932 | Spohrer | 417/243 |
| 2,017,408 | 10/1935 | Hasche | 417/243 |
| 2,786,341 | 3/1957 | Green | 62/138 |
| 3,910,062 | 10/1975 | Rojas | 62/406 |
| 3,942,330 | 3/1976 | Schroder | 62/5 |
| 4,052,178 | 10/1977 | Frantz | 55/212 |
| 4,237,696 | 12/1980 | Coblentz | 62/93 |
| 4,242,110 | 12/1980 | Hynes | 55/269 |

FOREIGN PATENT DOCUMENTS

| | | | |
|---|---|---|---|
| 1131354 | 6/1962 | Fed. Rep. of Germany | 417/243 |
| 1451129 | 5/1969 | Fed. Rep. of Germany | 165/11 |
| 589387 | 3/1959 | Italy | 165/104.19 |

Primary Examiner—Albert W. Davis, Jr.
Attorney, Agent, or Firm—David L. Ray

[57] ABSTRACT

A method and apparatus for removing moisture from compressed gases such as compressed air, the apparatus being completely self contained and requiring no external power or energy source, nor any source of coolant medium, other than ambient air. The apparatus of the invention comprises a reservoir for containing a volume of liquid, and a heat exchanger connected to the reservoir located beneath the reservoir through which the liquid from the reservoir can circulate. The method of the invention comprises circulating compressed air through the heat exchanger to reduce the temperature of the compressed air and condense moisture therefrom, and circulating water through the heat exchanger from the reservoir to reduce the temperature of compressed air circulated through the heat exchanger.

9 Claims, 1 Drawing Figure

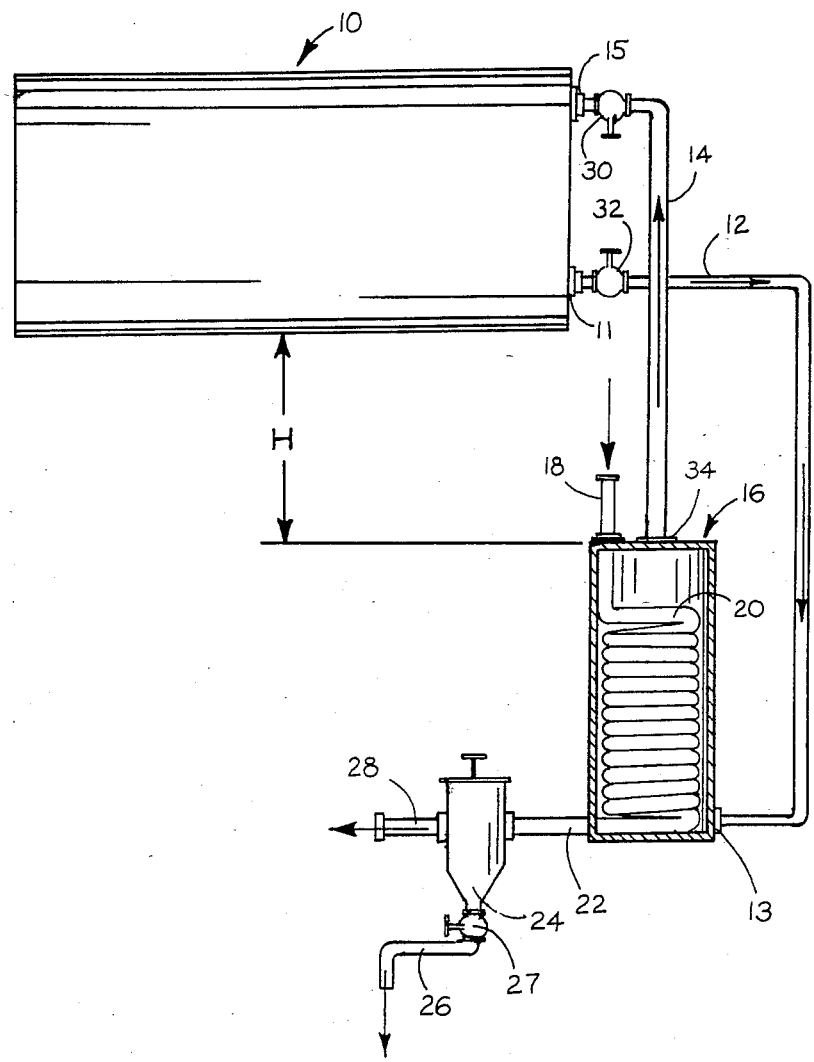

METHOD AND APPARATUS FOR REMOVING MOISTURE FROM COMPRESSED AIR

BACKGROUND OF THE INVENTION

1. Field of the Invention

The present invention relates to a method and apparatus for removing moisture from a compressed gas. In particular, the present invention relates to a method and apparatus for removing moisture from compressed air. Even more particularly, the present invention is related to a method and apparatus for removing moisture from compressed air which utilizes ambient temperature changes to provide coolant for removal of moisture from compressed air, and requires no external coolant source or energy source.

2. Description of the Related Art

Numerous devices are known in the art for removing moisture from (dehumidifying) compressed air. However, such devices require an external coolant or cooling process to be utilized in order to cool the compressed air sufficiently for the moisture to be removed from the air by condensation of the moisture. Coolants such as cold water, ice, and cold air sources have been utilized to cool compressed air to the point at which condensation occurs and moisture is removed from the compressed air. Hence, to provide such coolant sources and cooling processes requires the expenditure of energy. If ice is used to cool water, it is necessary to utilize energy to produce ice. If a conventional air conditioning system is used to provide coolant to cool the compressed air to promote condensation, energy is consumed by the refrigeration unit.

U.S. Pat. No. 3,910,062 discloses a dehumidifier having a tank containing a solution of cold water for cooling air passing through a tubular coil submerged in the tank so that the moisture content of the air is reduced. The water is cooled by adding ice thereto, or cold water from another source.

U.S. Pat. No. 3,942,330 discloses a method and apparatus for removing oil and water vapor from a compressed gas. The apparatus employs a vortex tube and a heat exchanger. The apparatus used in the method utilizes the energy in a portion of process gas.

U.S. Pat. No. 4,052,178 discloses a compressed air filter assembly utilized for centrifugally cooling and separating condensed moisture from compressed air and discharging clean air in the saturated condition at the outlet temperature and pressure. The air filter assembly utilizes the energy of the compressed gas by dropping the pressure of the gas in the filter to swirl the gas in a centrifugal manner through the filter to cool and remove moisture from the gas.

U.S. Pat. No. 4,242,110 discloses a drying apparatus for drying compressed air. The apparatus is a single vessel partitioned into various flow passages to direct the incoming water vapor bearing compressed gases through a heat exchanger, a refrigeration section, a de-mister, and then through a second heat exchanger for exit from the apparatus. Refrigeration coils are located in the space between the exterior casing and interior casing and lead to a suitable compressor-evaporator refrigeration system.

U.S. Pat. No. 4,237,796 discloses a compressed air system wherein the compressor receives air from the inlet cooler and dryer, compresses the air, and delivers it to a reheat air dryer where additional moisture is removed and the air is reheated. The chiller water line from the inlet cooler dryer passes through the reheat air dryer to remove additional moisture and back in the water chiller to form a closed cycle recycling water system.

U.S. Pat. No. 2,786,341 show a direct evaporative vortex refrigeration system in which a flow of gaseous fluid is cooled. The power source is a jet engine compressor which provides air under pressure. Water is injected into the compressed air to further cool the air.

Thus, the various gas drying apparatus and methods of the prior art require cooling units which require substantial amounts of external power in order to properly cool the gas to separate water therefrom, which results in higher energy costs. The method and apparatus of the present invention overcomes these problems by providing a method and apparatus which require no external power and no external water or coolant supply.

SUMMARY OF THE INVENTION

In accordance with the present invention there is provided a method and apparatus for removing moisture from compressed gases such as compressed air, the apparatus being completely self contained and requiring no external power or energy source, nor any source of coolant medium, other than ambient air. The apparatus of the invention comprises a reservoir for containing a volume of liquid, and a heat exchanger connected to the reservoir located beneath the reservoir through which the liquid from the reservoir can circulate. The method of the invention comprises circulating compressed air through the heat exchanger to reduce the temperature of the compressed air and condense moisture therefrom, and circulating water through the heat exchanger from the reservoir to reduce the temperature of compressed air circulated through the heat exchanger.

One of the principal and most important advantages of the method and apparatus of the invention over the methods and apparatuses shown in the prior art is that no external energy source other than ambient air is required to effect cooling and drying of a compressed gas such as air. No outside cool water supply or electrical energy is required, and therefore there is no water water to dispose of or utility bills to pay. The system is completely self contained, and uses as its energy source the difference in ambient temperature occurring during day and night. The reservoir is cooled at night by ambient air to provide a supply of cool water to cool the compressed air flowing through the heat exchanger during the normal eight hour workday to a temperature lower than the ambient temperature experienced during the normal eight hour workday. No significant pressure drop occurs across the heat exchanger and thus there is no additional energy required from the air compressor to cool and dry the compressed air.

BRIEF DESCRIPTION OF THE DRAWINGS

The drawing is a schematic representation, partly in cross-section, of the apparatus of the invention.

DESCRIPTION OF THE PREFERRED EMBODIMENTS

Referring now to the drawings, a reservoir for holding a coolant such as water is generally indicated by the numeral 10. Outlet pipe 12 and inlet pipe 14 connect reservoir 10 to the heat exchanger generally indicated by the numeral 16. Heat exchanger 16 has an inlet 18 through which compressed air, or other gas, enters coil 20, and an outlet 22 from which compressed air exits coil 20. The compressed air then travels to conventional air filter-regulator 24, which filters the compressed air and controls the outlet pressure of the compressed air in line 28. Air filter 24 has a water drain pipe 26 through which water can be withdrawn by opening valve 27. If desired, valve 27 may be replaced with an automatic float valve which is well known in the art. Compressed air then exits from outlet 28 at, or below, the ambient temperature of the area in which the compressed air is used.

Valves 30 and 32 are included for testing purposes only, and would be excluded in the preferred embodiment of the invention. Thus, valves 30 and 32 are open in the following description of the operation of the invention.

The apparatus of the invention operates in the following manner. As compressed air at elevated temperatures enters heat exchanger 16 through inlet 18, the compressed air travels through coils 20 which are cooled by a fluid such as water supplied from reservoir 10. The fluid in reservoir 10 is cooled by ambient night temperatures. At night, the temperature of the water in the reservoir closely approaches the cooler ambient night temperatures. Thus, reservoir 10 acts as a cool water reservoir for heat exchanger 16. Reservoir 10 is preferably a plastic drum or barrel.

Flow between reservoir 10 and heat exchanger 16 is accomplished due to the heating of water from reservoir 10 in heat exchanger 16. The water in heat exchanger 16 surrounding coil 20 migrates upwardly through outlet 34 when heated by compressed air in coil 20 and upwardly through line 14 to enter the top of reservoir 10 at entrance 15. At the same time, cooler water travels outwardly from exit 11 at the bottom of reservoir 10 through pipe 12 and into the bottom of heat exchanger 16 at inlet 13.

It is important that reservoir 10 be maintained at a height H above the uppermost portion of heat exchanger 16. If reservoir 10 were not maintained at a height H above reservoir 16 proper flow due would not occur. Height H is preferably at least 12 inches.

The reservoir 10 should be sized of sufficient volume to provide cool water throughout the normal eight hour working day to heat exchanger 16. The size of reservoir 10 depends upon the volume of compressed air flowing through heat exchanger 16 and the period of time through which the compressed air flows.

In common automobile paint and body shops, the air compressor is operated at intervals of about 10 to 20 minutes during the workday. It has been found that for compressed air flow up to 30 cubic feet per minute during such 10 to 20 minute intervals over an eight hour workday when the air compressor is operated, a 30 gallon reservoir is sufficient when used with a cylindrical heat exchanger having a four inch inner diameter and an 18 inch length, the heat exchanger having a coil 20 of 30 feet in length of ⅜ inch outer diameter tubing, and having a water inlet 12 of ¼ inch inner diameter pipe and a water outlet of 14 of ⅜ inch outer diameter pipe.

If greater amounts of air flow are needed a larger reservoir and a larger heat exchanger would be required. The reservoir preferably is shaded from the sun during the day and placed in an area where ambient temperatures at night can cool the water in the reservoir.

EXAMPLE

An apparatus in accordance with the present invention as described above and in the drawing was constructed employing a heat exchanger 16 comprising a cylinder four inches in diameter and 18 inches tall having a coil 20 comprising a 30 foot long coil of ¼ inch inner diameter copper tubing. Pipe 14 had an inner diameter of ⅜ inch and pipe 12 had an inner diameter of ¼ inch. Reservoir 10 was a plastic drum having a volume of 55 gallons and was cylindrical in shape. Height H was 12 inches. The diameter of reservoir 10 was 22 inches, and inlet 15 was located 15 inches above outlet 11.

In the tables of data below, "COMP." refers to the air compressor (not shown in drawing) which supplies compressed air to inlet 18; "H.E." refers to heat exchanger 16; "RES.". refers to reservoir 10; "AMB." refers to the ambient temperature.

Valves 30 and 32 shown in the drawing were installed for testing purposes. In Table I, reservoir 10, heat exchanger 16, and pipes 12 and 14 were filled with water, valves 30 and 32 were closed, and the air compressor was operated for the times indicated.

Testing shown in Tables I–III began at 10:30 a.m. and continued until 2:15 p.m. of the same day on a single test unit. For example, in Table I, the compressor is shut off at 11:35 a.m., valves 30 and 32 are opened, and the compressor is turned on at 11:45 a.m. as shown in Table II.

TABLE I

| | VALVE 30 and 32 CLOSED | | | | |
| --- | --- | --- | --- | --- | --- |
| TIME | TEMP. OF AIR OUT OF COMP. AT INLET 18 (°F.) | TEMP. OF AIR OUT OF H.E. AT OUTLET 22 (°F.) | TEMP. AT INLET 13 OF H.E. (°F.) | TEMP. AT OUTLET 34 OF H.E. (°F.) | TEMP. OF AMB. AIR (°F.) |
| 10:30 a.m. - COMP. on | 62 | 62 | 62 | 62 | 65 |
| 10:35 a.m. - COMP. off | 76 | 62 | 62 | 61 | 65 |
| 10:40 a.m. - COMP. on | 64 | 61 | 62 | 62 | 65 |
| 10:45 a.m. - COMP. off | 80 | 60 | 61 | 61 | 65 |
| 10:55 a.m. - COMP. on | 66 | 60 | 61 | 62 | 65 |
| 11:00 a.m. - COMP. off | 92 | 62 | 61 | 64 | 65 |
| 11:05 a.m. - COMP. on | 75 | 62 | 61 | 65 | 66 |
| 11:15 a.m. - COMP. off | 104 | 67 | 62 | 68 | 66 |
| 11:25 a.m. - COMP. on | 74 | 66 | 62 | 68 | 66 |
| 11:35 a.m. - COMP. off | 108 | 72 | 63 | 71 | 66 |

TABLE II

| | VALVES 30 and 32 OPEN | | | | |
| --- | --- | --- | --- | --- | --- |
| 11:45 a.m. - COMP. on | 74 | 67 | 60 | 72 | 66 |
| 11:55 a.m. - COMP. off | 109 | 71 | 61 | 76 | 67 |
| 12:05 p.m. - COMP. on | 74 | 66 | 61 | 72 | 67 |
| 12:15 p.m. - COMP. off | 110 | 67 | 60 | 76 | 68 |

TABLE II-continued

| VALVES 30 and 32 OPEN | | | | | |
|---|---|---|---|---|---|
| 12:30 p.m. - COMP. on | 70 | 65 | 61 | 70 | 69 |
| 12:40 p.m. - COMP. off | 111 | 67 | 61 | 75 | 67 |
| 12:55 p.m. - COMP. on | 76 | 66 | 61 | 72 | 68 |

TABLE III

| COMPRESSOR RUNNING CONTINUOUSLY VALVES 30 and 32 OPEN | | | | | |
|---|---|---|---|---|---|
| 1:55 p.m. - COMP. on | 67 | 64 | 62 | 65 | 71 |
| 2:05 p.m. | 99 | 65 | 62 | 68 | 72 |
| 2:10 p.m. | 107 | 67 | 62 | 71 | 73 |
| 2:15 p.m. - COMP. off | 111 | 68 | 62 | 74 | 74 |

No moisture was detected in air in Tables II and III since the temperature of compressed air out of heat exchanger 16 was equal to or below the temperature of ambient air after 10 minutes. After valves 30 and 32 were opened in Tables II and III, flow was established between heat exchanger 16 and reservoir 10, and after the initial 10 minutes ran to 11:55 a.m., the outlet air temperature stayed below the ambient temperature throughout the remainder of the test. The temperature at 11:55 a.m. in Table II was above the ambient temperature of air (71° F. versus 67° F.) because heat had built up in heat exchanger 16 due to valves 30 and 32 being closed in Table I.

Although the preferred embodiments of the present invention have been disclosed and described in detail above, it should be understood that the invention is in no sense limited thereby, and its scope is to be determined by that of the following claims.

What is claimed is:

1. A self contained apparatus for cooling and removing moisture from a heated compressed gas which requires no external energy source or coolant source other than ambient air, comprising:

a. heat exchanger means for receiving and conveying therethrough a coolant liquid and a compressed gas, and for cooling said compressed gas to a temperature at or below the temperature of the atmosphere into which the compressed gas is discharged, said heat exchanger means having coil means therein for receiving and conveying gas threrethrough, said heat exchanger means having a coolant liquid inlet means connected to first pipe means for receiving and discharging said coolant liquid and a coolant liquid outlet means connected to second pipe means for receiving and discharging said coolant liquid, said heat exchanger means having a top portion and a bottom portion, said coolant liquid outlet means in said heat exchanger means being located in said top portion of said heat exchanger means and said coolant liquid inlet means in said heat exchanger means being located in said bottom portion of said heat exchanger means, and b. reservoir means for containing said coolant liquid, said reservoir means being exposed to ambient air to enable said coolant liquid in said reservoir to be cooled solely by ambient air, said reservoir means being positioned at least 12 inches above said heat exchanger means, said reservoir means having a coolant liquid inlet means connected to said second pipe means and a coolant liquid outlet means connected to said first pipe means for receiving and discharging said coolant liquid, said reservoir means having a top portion and a bottom portion, said coolant liquid outlet means in said reservoir means being located in said bottom portion of said reservoir means, and said coolant liquid inlet means in said reservoir means being located in said top portion of said reservoir means.

2. The apparatus of claim 1 wherein said coolant liquid is water and said compressed gas is air.

3. The apparatus of claim 2 wherein said reservoir means has a volume of at least 30 gallons.

4. The apparatus of claim 3 wherein said reservoir means is a hollow, cylindrical plastic drum.

5. The apparatus of claim 4 wherein said heat exchanger means is a hollow cylinder having an inside diameter of at least four inches.

6. The apparatus of claim 5 wherein said heat exchanger means is at least 18 inches in length.

7. The apparatus of claim 1 wherein gas filter and pressure regulator means are connected to said heat exchanger means for receiving and filtering said compressed gas which has been conveyed through said heat exchanger means.

8. The apparatus of claim 7 wherein water drain means is connected to said gas filter and pressure regulator means to remove water from said gas filter and pressure regulator means.

9. The method of claim 1 wherein said compressed gas is air and said liquid coolant is water.

* * * * *